United States Patent Office 3,551,573
Patented Dec. 29, 1970

3,551,573
INSECTICIDAL COMPOSITION AND METHOD CONTAINING ANILINOMETHYLENE MALONITRILES
Joseph W. Baker, Kirkwood, and Robert K. Howe, Bridgeton, Mo., assignors to Monsanto Company, St. Louis, Mo., a corporation of Delaware
No Drawing. Filed Nov. 8, 1967, Ser. No. 681,578
Int. Cl. A01n 9/20
U.S. Cl. 424—304
24 Claims

ABSTRACT OF THE DISCLOSURE

Pesticidal and systemic insecticidal anilino-methylene compounds of the formula

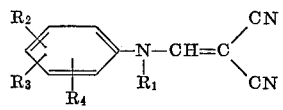

wherein $R_1$ is selected from the group consisting of hydrogen and alkyl having a maximum of 8 carbon atoms; $R_2$, $R_3$ and $R_4$ are independently selected from the group consisting of hydrogen, alkyl having a maximum of 8 carbon atoms, hydroxy, alkoxy having a maximum of 4 carbon atoms, halogen, nitro, carboalkoxy having a maximum of 5 carbon atoms, trifluoromethyl, trichloromethyl,

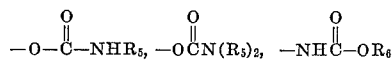

and $NH_2SO_2$— where $R_5$ and $R_6$ are alkyl having a maximum of 5 carbon atoms; provided that when $R_2$, $R_3$ and $R_4$ are alkyl branched on the alpha carbon or are trichloromethyls, they are on other than adjacent positions; further provided that when one of the groups $R_2$, $R_3$ and $R_4$ is

or $NH_2SO_2$— the remaining groups are hydrogen. Compounds in which at least one of the groups $R_2$, $R_3$ or $R_4$ is trifluoromethyl group are new compounds.

---

This invention relates to novel anilinomethylene-malonitriles and their use as pesticides and systemic insecticides.

The compounds of this invention are represented by the formula

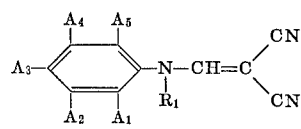

wherein $R_1$ is selected from the group consisting of hydrogen and alkyl having a maximum of 8 carbon atoms; $A_1$, $A_2$, $A_3$, $A_4$, and $A_5$ are independently selected from the group consisting of hydrogen, alkyl having a maximum of 8 carbon atoms, chlorine, bromine, fluorine, iodine, nitro, cyano, hydroxy, alkoxy having a maximum of 5 carbon atoms, phenyl and substituted phenyl in which the substituents are the groups defined by $A_1$, $A_2$, $A_3$, $A_4$ and $A_5$, trichloromethyl, trifluoromethyl, carboalkoxy having a maximum of 8 carbon atoms,

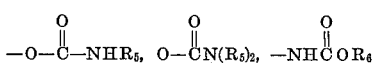

and $NH_2SO_2$—; wherein $R_5$ and $R_6$ are alkyl groups having a maximum of 5 carbon atoms; provided that when $A_1$, $A_2$, $A_3$, $A_4$ or $A_5$ are alkyl-branched on the alpha carbons, trichloromethyl, pheny or substituted phenyl they are on other than adjacent carbons and there are a maximum of 3 such substituents, the remaining groups being hydrogen; further provided that when $A_1$, $A_2$, $A_3$, $A_4$ or $A_5$ are

or $NH_2SO_2$— there is only one such substituent, the remaining groups being hydrogen.

The preferred compounds of this invention are represented by the formula

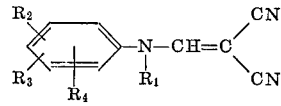

wherein $R_1$ is selected from the group consisting of hydrogen and alkyl having a maximum of 8 carbon atoms; $R_2$, $R_3$ and $R_4$ are each independently selected from the group consisting of hydrogen, alkyl having a maximum of 8 carbon atoms, hydroxy, alkoxy having a maximum of 4 carbon atoms, halogen, nitro, carboalkoxy having a maximum of 5 carbon atoms, trichloromethyl, trifluoromethyl,

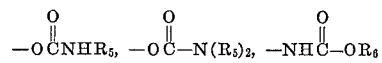

and $NH_2SO_2$—; wherein $R_5$ and $R_6$ are alkyl groups having a maximum of 5 carbon atoms; provided that adjacent groups $R_2$, $R_3$ and $R_4$ are not branched on the alpha carbons nor are trichloromethyls; further provided that when one of the groups $R_2$, $R_3$ and $R_4$ is

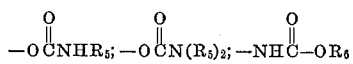

or $NH_2SO_2$— the remaining groups are hydrogen.

Systemic insecticides, as distinguished from general pesticidal activity, are compounds which when applied to the soil around the plant or to a portion of the plant, for example the root system, are absorbed into the plant system and translocated to all growing parts of the plant. Insects coming in contact with the plant are affected by the compound or its metabolite which is present in the plant system. The term "plant environment" used hereinafter is defined as any part of the plant or the soil around the plant.

The term "insect" and "insecticide" as used hereinafter is defined in accordance with the "Federal Insecticide, Fungicide, and Rodenticide Act" of 1947, Section 2. Subsection h, which defines "insect" as to include not only small invertebrate animals belonging mostly to the class Insecta, which comprises six-legged, usually winged forms, as beetles, bugs, bees, flies and so forth, but also other allied classes of arthropods whose members are wingless and usually have more than six legs, as spiders, mites, ticks, centipedes and wood lice.

The preparation of anilinomethylenemalonitriles is by known methods and consists in the reaction of the appropriate amine with ethoxymethylenemalonitrile, usually in a solvent and at elevated temperatures, (a)

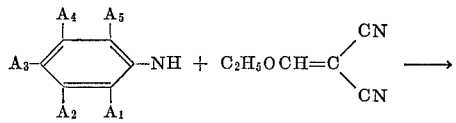

wherein $R_1$, $A_1$, $A_2$, $A_3$, $A_4$ and $A_5$ are as previously defined.

The product is separated from the reaction mixture by conventional methods such as filtration, distillation, concentration and the like.

Preparation of the N-alkyl derivatives of anilinomethylenemalonitriles can also be accomplished by reacting the corresponding anilinomethylenemalonitrile with a dialkyl sulfate, or by the reaction of the anilinomethylenemalonitrile with an alkyl halide in a sulfoxide, sulfone, or N,N-dialkylamide solvent.

N-alkylanilinomethylenemalonitriles can also be prepared by the reaction of N-alkyl-N-formyl anilines with a complex of the formula $$(R_9)_3O^{\oplus}BF_4^{\ominus}$$

to form an intermediate which when reacted with malonitrile, in the presence of a base such as a tertiary amine or an alkali metal carbonate, gives the desired N-alkylanilinomethylenemalonitrile.

Many of the amines are commercially available or are prepared by known procedures, such as reduction of nitrobenzene and substituted nitrobenzene; nuclear halogenation of nitrobenzene, followed by reduction of the nitro group or halogenation of aniline, toluidine and the like; trifluoromethyl derivatives of aniline can be prepared according to the method, among others, of Rouche, Bull. Acad. Roy. Belg. 13, 346 (1927), Swarts, Bull. Acad. Roy. Belg. 6, 390 (1920) or Brown et al., J. Chem. Soc. [1949] 98.

The reaction temperature for the preparation of anilinomethylenemalonitriles is dependent upon the particular reactants employed. Reaction of substituted anilines with alkoxymethylenemalonitriles are usually run at a temperature in the approximate range of 10–150° C. The compounds are preferably dissolved in a suitable solvent including lower alkyl ethers and alcohols, such as diethyl ether, methanol, propanol and the like, and aromatic hydrocarbons such as benzene, toluene, xylene and the like. The reaction mixture is normally heated to the reflux temperature of the mixture and maintained at this temperature until the reaction is completed.

For N-alkylanilinomethylenemalonitriles a secondary aniline can be used to give the N-alkyl derivative directly or the unalkylated compound can be made first and then alkylated using a dialkylsulfate as the alkylating agent, (b) 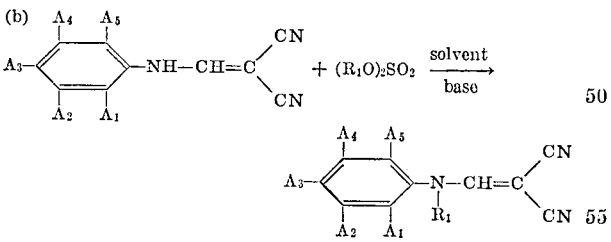

wherein $R_1$, $A_1$, $A_2$, $A_3$, $A_4$, $A_5$ is s previously defined.

This procedure is required, when due to the nature of the alkyl group such as steric hindrance etc., the N-alkyl compound cannot be prepared directly. N-alkyl compounds in which the alkyl group has a maximum of 8 carbon atoms can be prepared by this method.

The alkylation reaction is usually run in a solvent such as acetone, tetrahydrofuran, dioxane and the like. The components are mixed in the solvent and a base, such as potassium or sodium carbonate added. The product is separated from the reaction mixture by conventional methods. In this procedure the reaction temperature is in the approximate range of 20–150° C. The base and dialkylsulfate are present in approximately equal proportions. The dialkylsulfate is present in either approximately equal mole proportions or in excess of the mole quantity of the anilinomethylenemalonitrile.

A second procedure for alkylation of anilinomethylenemalonitrile is by reaction with an alkyl halide in a sulfoxide, sulfone, or N,N-dialkylamide solvent, (c) 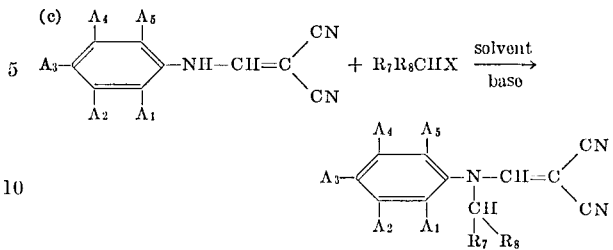

wherein $R_7$ is selected from the group consisting of hydrogen and methyl, $R_8$ is selected from the group consisting of hydrogen and alkyl having a maximum of 12 carbon atoms and X is selected from the group consisting of chlorine, bromine and iodine.

This reaction is usually run in a sulfoxide or sulfone solvent such as dimethylsulfoxide, diethylsulfoxide, tetramethylenesulfoxide, tetramethylenesulfone, N,N-dimethylacetamide, N-methylpyrrolidone, and the like, at a temperature in the approximate range of 20 to 160° C.

The hydrogen halide produced as a by-product is neutralized with a base such as potassium carbonate, potassium bicarbonate, sodium carbonate, sodium bicarbonate, zinc oxide, mgnesium oxide and the like. The product is separated from the reaction medium by conventional means.

The alkyl halide and the anilinomethylenemalonitrile are present, in the reaction medium, in approximately equal mole proportions. It is, however, convenient to use a slight excessive of the alkyl halide to ensure completion of the alkylation.

A third method for preparing anilinomethylenemalonitriles and preferably N-alkyl anilinomethylenemalonitriles is by the reaction of substituted formanilides with a trialkyloxonium tetrafluoroborate to form complex which is then reacted with malonitrile to give the desired product.

(d) 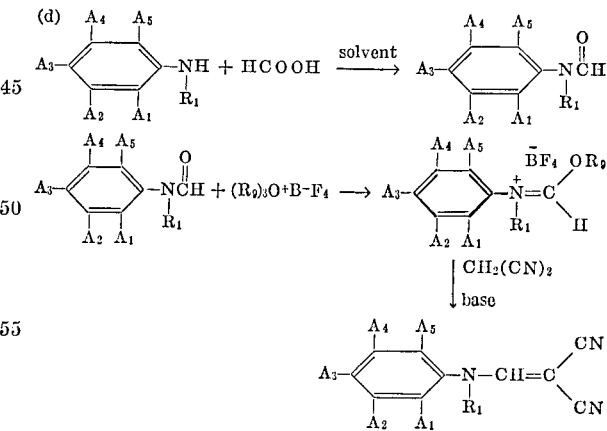

wherein $R_1$, $A_1$, $A_2$, $A_3$, $A_4$ and $A_5$ are as previously defined and $R_9$ is alkyl having a maximum of three carbon atoms.

This method is necessary, but not limited to compounds, where the starting aniline is not sufficiently nucleophilic to react with alkoxymethylenemalonitriles according to the standard procedure.

In this procedure, the starting substituted aniline is reacted with formic acid, according to standard procedures, to yield substituted formanilide. The formanilide is then reacted with either trimethyl, triethyl or tri-n-propyl-oxonium tetrafluoroborate in a solvent to yield the complex. Malonitrile is then added to the complex and the reaction mixture slowly made alkaline by the addition of a base such as sodium carbonate, potassium carbonate or a lower alkyl tertiary amine. The product is recovered from the reaction mixture by standard procedures.

The trialkyloxonium tetrafluoroborate is prepared according to the procedure of H. Meerwein in "Methodeu du Organischen Chemie" by Houben-Weyl (Georg Thieme Verlog, Stuttgart, 4th ed., vol. VI/3, 1965).

The mole proportions of formanilide and trialkyl oxonium tetrafluoroborate can vary from approximately equal proportions to a 10/1 (borate/formanilide) ratio. Preferably the ratio is in the approximate range of 1/1 to 2/1 (borateformanilide). The malonitrile is added in approximately equal mole proportions to the borate.

The reaction is generally run in a solvent such as dichloromethane, chloroform, dichloroethane, benzene, and the like, at a temperature in the approximate range of 15–40° C. The reaction is exothermic, however, when a solvent is used no external cooling is usually required as the reaction temperature is controlled by the solvent.

The following examples are illustrative of the preparation of representative compounds of the invention, but not limitative thereof. All expressions of proportions in the specification and claims are parts by weight.

EXAMPLE 1

2-chloro-5-trifluoromethylanilinomethylenemalonitrile

To a suitable vessel equipped with an agitator, reflux condenser and thermometer was charged 19.6 parts of 3-amino-4-chlorobenzotrifluoride and 12.2 parts of ethoxymethylenemalonitrile in 125 parts ethanol and the mixture refluxed for 48 hours. The solution was then cooled, precipitating the product. The product was collected and washed with ethanol. Recrystallization from ethanol gave the product having a melting point of 177–179° C. via 70% yield.

Analysis.—Calculated for $C_{11}H_5Cl_1F_3N_3$ (percent): C, 48.64; H, 1.86. Found (percent): C, 48.86; H, 2.00.

EXAMPLE 2

2,4-dibromo-5-trifluoromethylanilinomethylenemalonitrile

To a suitable vessel, equipped with an agitator, reflux condenser and thermometer, was charged 11.8 parts sodium acetate and 34.5 parts 6-bromo-α,α,α-trifluoro-m-toluidine and 100 parts glacial acetic acid. To this mixture was added, with agitation, 23 parts of bromine. A white solid, which was probably sodium bromide, precipitated in a few minutes. The resultant mixture was heated on a steam bath for 45 minutes after which the solvent was removed and water added to the residue. The aqueous mixture was extracted with ether and the ether solution washed with a sodium hydroxide solution, dried over sodium sulfate and distilled. The product, 4,6-dibromo-α,α,α-trifluoro-m-toluidine, distilled at 137–141°/10 mm. solidifying in the receiver. Recrystallization from pentane gave a solid melting at 46.5–48° C.

Analysis.—Calculated for $C_7H_4Br_2F_3N$ (percent): C, 26.36; H, 1.26. Found (percent): C, 26.50; H, 1.33. The NMR (nuclear magnetic resonance) spectrum further identified the product.

15.15 parts of 4,6-dibromo-α,α,α-trifluoro-m-toluidine, prepared above, 5.8 parts ethoxymethylenemalonitrile and 110 parts ethanol was charged to a suitable vessel having an agitator, reflux condenser and thermometer. The mixture was maintained at reflux temperature for 47 hours, after which time the mixture was cooled and the solid which separated from the solution was collected and washed with ethanol. The solid was recrystallized from an acetone-methanol-water solution to give 2,4-dibromo-5-trifluoromethylanilinomethylenemalonitrile, melting point 225–227.5° C.

Analysis.—Calculated for $C_{11}H_4Br_2F_3N_3$ (percent): C, 33.45; H, 1.02. Found (percent): C, 33.39; H, 1.20.

EXAMPLE 3

3,5-di-trifluoromethyl-N-ethylanilinomethylenemalonitrile

To a suitable vessel, equipped with an agitator, reflux condenser, and thermometer, was charged 15.26 parts 3,5-ditrifluoromethylanilinomethylenemalonitrile, prepared by the procedure given in Example 1, 13.82 parts potassium carbonate, 8.14 parts diethyl sulfate and 150 parts tetrahydrofuran. The resultant mixture was refluxed for 22 hours. Water was then added to the mixture and the resultant mixture extracted with ether. Concentration of the ether solution yielded an oil residue which solidified upon the addition of hexane. The solid was collected and recrystallized from a methanol-water mixture to yield 3,5 - di - trifluoromethyl - N - ethylanilinomethylenemalonitrile melting at 118–120° C.

Analysis.—Calculated for $C_{14}H_9F_6N_3$ (percent): C, 50.46; H, 2.72. Found (percent): C, 50.59; H, 2.78.

EXAMPLE 4

N-n-octyl-3,4-dichloroformanilide

To a suitable vessel, equipped with an agitator, reflux condenser and thermometer, was charged 82.2 parts 3,4-dichloro-N-n-octylanilino and 100 parts of about 97% formic acid and the mixture refluxed for about 24 hours. The mixture was concentrated, the distillate boiling at 105–110° C.

The residue was dissolved in about 300 ml. diethyl ether and extracted with two 200 ml. portions of potassium carbonate solution, and 200 ml. water. The ether solution was then dried over sodium sulfate and fractionated, the product boiling at 155° C./0.25 mm.

Analysis.—Calculated for $C_{15}H_{21}Cl_2NO$ (percent): C, 59.60; H, 7.00. Found (percent): C, 59.78; H, 6.89.

EXAMPLE 5

N-n-octyl-3,4-dichloroanilinomethylenemalonitrile

To a suitable vessel equipped with an agitator, reflux condenser and means for adding components to the vessel was charged 285 parts borontrifluoride etherate and 500 parts diethyl ether. To this solution was added, with agitation and at a rate to maintain vigorous boiling, 140 parts epichlorohydrin. The product separates as an oil from the reaction medium during the epichlorohydrin addition and then crystallizes. Upon completion of the epichlorohydrin addition, the reaction medium is agitated for about 2 hours and then let stand for about 10 hours. The product is filtered, washed with diethyl ether and dried in vacuum. The product, triethyloxonium tetrafluoroborate, M.P. 92° C., is stored under diethyl ether until used. The reaction and storage to be under essentially anhydrous conditions.

To a suitable vessel, equipped with an agitator, thermometer and reflux condenser, was charged, at room temperature a solution of 30.2 parts N-n-octyl-3,4-dichloroformanilide in 60 parts dichloromethane and a solution of 20 parts triethyloxonium tetrafluoroborate in 60 parts dichloromethane. The solution of formanilide added with stirring, to the tetrafluoroborate solution. The reaction was exothermic and the reaction temperature rose to 28° C. The reaction was stirred for about 1½ hours and then 14.5 parts malonitrile and 1 part triethylamine was added. An additional 10 parts triethylamine was added with stirring. Upon addition of the triethylamine the reaction mixture boiled. The mixture was filtered and 100 parts dichloromethane added to the filtrate. The filtrate was then extracted with three 250 ml. portions of water and the organic layer dried over sodium sulfate and concentrated under reduced pressure. The oil residue, which consisted mainly of the product, was chromatographed on neutral active I alumina using benzene as solvent. Evaporation of the benzene under reduced pressure yielded the pure product.

*Analysis.*—Calculated for $C_{18}H_{21}Cl_2N_3$ (percent): C, 61.72; H, 6.04; N, 12.00. Found (percent): C, 61.94; H, 6.22; N, 11.84.

EXAMPLE 6

Alkylation of 3-trifluoromethyl-4-chloroanilinomethylenemalonitrile is as follows:

To a suitable vessel, equipped with an agitator, thermometer and reflux condenser, was charged 2.68 parts 3-trifluoromethyl - 4 - chloroanilinomethylenemalonitrile, 2.76 parts potassium carbonate, 2.52 parts dimethylsulfate and 30 parts acetone. The mixture was stirred at room temperature for about 40 minutes and then poured into 300 ml. water. Additional potassium carbonate was added and the mixture extracted with two 150 ml. portions of diethyl ether. The combined ether portions were extracted with sodium chloride solution and dried over sodium sulfate. The solution was concentrated yielding an oil residue which solidified. The solid was recrystallized from ethanol-water. Melting point of the solid 93–95° C.

*Analysis.*—Calculated for $C_{12}H_7ClF_3N_3$ (percent): C, 50.45; H, 2.47. Found (percent): C, 50.19; H, 2.46.

EXAMPLE 7

Alkylation of 3,4-dichloroanilinomethylenemalonitrile is as follows:

To a suitable vessel equipped with an agitator, thermometer and reflux condenser, was charged 25 parts 3,4-dichloroanilinomethylenemalonitrile and 58 parts potassium carbonate. To this reaction mixture is charged a solution of 71.4 parts n-propyl iodide and 125 parts dimethylsulfoxide. The mixture is agitated and heated to a temperature in the range of approximately 90–100° C. for about 5 hours. The reaction mixture was filtered and the solids washed with diethyl ether.

The filtrate was concentrated and 250 parts water added to the concentrate. The water-concentrate portion was extracted with diethyl ether and the ether extract washed with water, dried over sodium sulfate and concentrated. The residue was an oil which partially crystallized on standing. Addition of a small amount of diethyl ether resulted in complete crystallization of the product, N-n-propyl-3,4-dichloroanilinomethylenemalonitrile. Recrysallized from ethanol-water and from methylcyclohexene, M.P. 65–68° C.

*Analysis.*—Calculated for $C_{13}H_{11}N_3Cl_2$ (percent): C, 55.73; H, 3.96. Found (percent): C, 55.50; H, 3.94.

Other anilinomethylenemalonitrile compounds which were prepared by the above procedures and their physical properties are as follows.

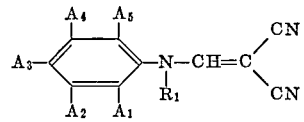

| | $R_1$ | $A_1$ | $A_2$ | $A_3$ | $A_4$ | $A_5$ | M.P., ° C |
|---|---|---|---|---|---|---|---|
| Coupled: | | | | | | | |
| 1 | H | H | H | H | H | H | 255–257 |
| 2 | $CH_3$ | H | H | H | H | H | 115–117 |
| 3 | H | H | H | $CH_3O$ | H | H | 268–270 |
| 4 | H | H | $CH_3O$ | H | H | H | 198–200 |
| 5 | H | Cl | H | H | H | H | 148.5–151.5 |
| 6 | H | H | Cl | H | H | H | 201–202 |
| 7 | H | H | $CF_3$ | H | H | H | 228–229 |
| 8 | H | H | H | $CF_3$ | H | H | 275–276 |
| 9 | H | H | H | $NO_2$ | H | H | [1] 318–319 |
| 10 | H | $CH_3$ | H | H | H | H | 162.5–164.5 |
| 11 | H | H | H | Cl | H | H | [1] 290–291 |
| 12 | H | H | H | $C_8H_{17}$* | H | H | 234–235 |
| 13 | H | H | H | $COOC_2H_5$ | H | H | 239–241 |
| 14 | $C_2H_5$ | H | H | $COOC_2H_5$ | H | H | 126–128 |
| 15 | $CH_3$ | H | H | $COOC_2H_5$ | H | H | 169–170 |
| 16 | H | H | $CH_3$ | H | H | H | 184–186 |
| 17 | $CH_3$ | H | $CH_3$ | H | H | H | 101–103 |
| 18 | $C_2H_5$ | H | $CH_3$ | H | H | H | 39–40 |
| 19 | H | H | Cl | Cl | H | H | 269–270 |
| 20 | n-$C_8H_{17}$ | H | Cl | Cl | H | H | (²) |
| 21 | H | H | $CF_3$ | Cl | H | H | 237–239 |
| 22 | H | H | $NO_2$ | Cl | H | H | 238–239 |
| 23 | H | H | $CH_3$ | $CH_3$ | H | H | 222–224 |
| 24 | H | Cl | H | t-$C_4H_9$ | H | H | 188–190 |
| 25 | H | $CH_3$ | Cl | H | H | H | 186–189 |
| 26 | $CH_3$ | H | $CF_3$ | Cl | H | H | 93–95 |
| 27 | H | H | $CF_3$ | H | $CF_3$ | H | 233–235 |
| 28 | H | H | $CF_3$ | H | H | Cl | 177–179 |
| 29 | H | $CH_3$ | H | H | H | $CH_3$ | [1] 170–172 |
| 30 | H | H | $CF_3$ | H | H | Br | 157–159 |
| 31 | $CH_3$ | H | $CF_3$ | H | $CF_3$ | H | 140–142 |
| 32 | $CH_3$ | H | $CF_3$ | H | H | Cl | 106.5–108 |
| 33 | H | Cl | H | Cl | H | H | 240–242 |
| 34 | $C_2H_5$ | H | Cl | Cl | H | H | 89–90 |
| 35 | $CH_3$ | Cl | H | Cl | H | H | 127–128 |
| 36 | $C_2H_5$ | Cl | H | Cl | H | H | 110–111 |
| 37 | $CH_3$ | H | Cl | Cl | H | H | 159–162 |
| 38 | $CH_3$ | Cl | Cl | H | H | H | 140–142 |
| 39 | $CH_3$ | Cl | H | H | Cl | H | 107–111 |
| 40 | $C_2H_5$ | Cl | Cl | H | H | H | 77–78 |
| 41 | $C_2H_5$ | Cl | H | H | Cl | H | 49–55 |
| 42 | $C_2H_5$ | H | $CF_3$ | H | $CF_3$ | H | 118–120 |
| 43 | H | Cl | H | H | Cl | H | [1] 189–191 |
| 44 | H | Cl | Cl | H | H | H | 194–196 |
| 45 | H | H | Cl | $CH_3$ | H | H | 222–224 |
| 46 | $CH_3$ | H | Cl | $CH_3$ | H | H | 142–144 |
| 47 | $C_2H_5$ | H | Cl | $CH_3$ | H | H | 99–102 |
| 48 | $C_2H_5$ | H | $CF_3$ | Cl | H | H | 68–75 |
| 49 | H | Cl | H | Cl | Cl | H | [1] 243–245 |
| 50 | H | $CH_3$ | H | Br | Cl | H | [1] 231–232 |
| 51 | H | H | $CF_3$ | Br | H | Br | 225–227.5 |

| Cpd. No. | R₁ | A₁ | A₂ | A₃ | A₄ | A₅ | M.P.,° C. |
|---|---|---|---|---|---|---|---|
| 52 | H | H | O—C(=O)N(CH₃)₂ | H | H | H | 171–173 |
| 53 | H | H | O—C(=O)NHCH₃ | H | H | H | 197–198 |
| 54 | H | H | NHC(=O)—O—CH(CH₃)₂ | H | H | H | [1] 243–244 |
| 55 | H | H | H | NH₂SO₂— | H | H | [1] 238–242 |

[1] Decanoate.

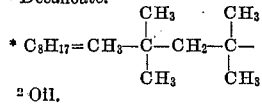

[2] Oil.

Many anilinomethylenemalonitrile are known in the art as ultraviolet absorbers and as potential muscle relaxants. These compounds, prior to the present invention, were never known to possess pesticidal activity in general or systemic insecticidal activity in particular.

Cycloalkyl, heterocyclic and open chained alkyl aminomethylenemalonitrile are known as fungicides. These compounds, however, possess little or no general pesticidal activity and no systemic inserticidal activity.

Replacement of the nitrile groups of the anilinomethylenemalonitrile with a diester or half ester deactivates the compound as to its pesticidal activity.

Pesticidal activity has been found to exist only when the amine moiety is aniline or substituted aniline and the malonic moiety is the dinitrile.

The following tables are presented to exhibit the effectiveness of the compounds according to the invention and their comparison with the cycloalkyl, heterocyclic and open chained alkyl aminomethylenemalonitriles, and with the diesters and half ester analogues of the anilinomethylenemalonitriles.

Results are in percent kill. Numbers in parenthesis are the concentrations (percent v./w.) which gave 100% kill and are included if the concentration is different than the column heading. The control, a commercial insecticide, has the formula

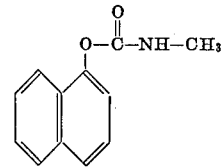

A review of Table 2 shows that substituting another group for the anilino group causes a loss in insecticidal activity on snails.

TABLE I.—INSECTICIDAL EFFECTS ON SOUTHERN ARMYWORMS

| Cpd. No. | R₁ | A₁ | A₂ | A₃ | A₄ | A₅ | Percent w./v. .01 | .005 | .001 |
|---|---|---|---|---|---|---|---|---|---|
| 19 | H | H | Cl | Cl | H | H | 100 | 100 | (.003) 100 |
| 21 | H | H | CF₃ | Cl | H | H | 100 | (.006) 100 | |
| 26 | CH₃ | H | CF₃ | Cl | H | H | 100 | 100 | (.003) 100 |
| 27 | H | H | CF₃ | H | CF₃ | H | 100 | 100 | (.0007) 100 |
| 28 | H | CF₃ | H | H | Cl | H | 50 | | |
| 30 | H | H | CF₃ | H | H | Br | 50 | | |
| 31 | CH₃ | H | CF₃ | H | CF₃ | H | 100 | 100 | |
| 32 | CH₃ | H | CF₃ | H | H | Cl | 100 | 40 | |
| 42 | C₂H₅ | H | CF₃ | H | CF₃ | H | 100 | 100 | 30 |
| 43 | H | Cl | H | H | Cl | H | 50 | | |
| 49 | H | Cl | H | Cl | Cl | H | 100 | (.006) 100 | |
| Control | | | | | | | 100 | 0 | |

TABLE 2.—MOLLUSCACIDAL EFFECTS ON SNAILS

| Coupled No. | $R_1$ | $A_1$ | $A_2$ | $A_3$ | $A_4$ | $A_5$ | 5 | 1 | .1 |
|---|---|---|---|---|---|---|---|---|---|
| 5 | H | Cl | H | H | H | H | 60 | 0 | |
| 6 | H | H | Cl | H | H | H | 60 | 0 | |
| 7 | H | H | $CF_3$ | H | H | H | 100 | 0 | |
| 8 | $CH_3$ | H | H | $CF_3$ | H | H | 30 | | |
| 9 | H | H | H | $NO_2$ | H | H | 30 | | |
| 10 | H | $CH_3$ | H | H | H | H | 30 | | |
| 12* | H | H | H | $C_8H_{17}$ | H | H | 100 | 30 | |
| 21 | H | H | $CF_3$ | Cl | H | H | 100 | 30 | 0 |
| 22 | H | H | $NO_2$ | Cl | H | H | 100 | 30 | |
| 27 | H | H | $CF_3$ | H | $CF_3$ | H | 100 | 100 | 0 |
| 28 | H | $CF_3$ | H | H | Cl | H | 100 | 60 | 30 |
| 30 | H | H | $CF_3$ | H | H | Br | 100 | 60 | 30 |
| 49 | H | Cl | H | Cl | Cl | H | 100 | 100 | 70 |
| 50 | H | $CH_3$ | H | Br | Cl | H | 100 | 30 | 0 |
| Control A | | | | | | | 100 | 30 | |
| Control B | | | | | | | | | |
| Control C | | | | | | | 0 | | |
| Control D | | | | | | | 0 | | |
| Control E | | | | | | | 0 | | |
| Control F | | | | | | | 0 | | |
| Control G | | | | | | | 0 | | |

Note.—Results are in percent kill.

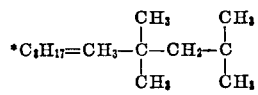

*$C_8H_{17} = CH_3-\underset{\underset{CH_3}{|}}{\overset{\overset{CH_3}{|}}{C}}-CH_2-\underset{\underset{CH_3}{|}}{\overset{\overset{CH_3}{|}}{C}}$ The controls used in Table 2 and Table 3 are as follows:

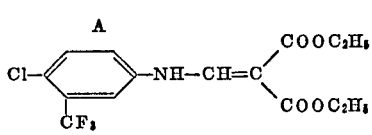

A

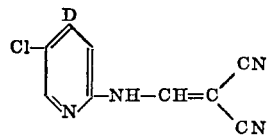

D

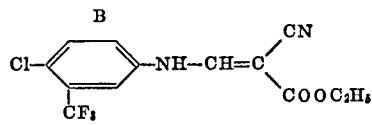

B

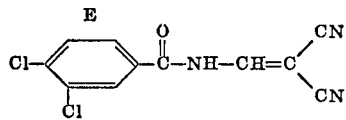

E

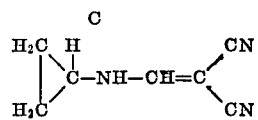

C

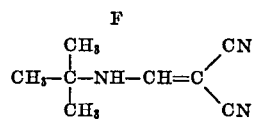

F

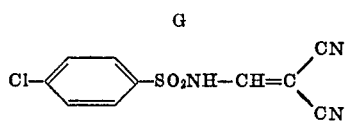

G

A review of Table 3 shows that as to insecticidal effect on cotton bollworms, both topical and systemic, the replacement of one or both nitrile groups with an ester causes a complete loss in insecticidal activity (control compounds A and B as compared to compound 21).

TABLE 3.—COMPARATIVE INSECTICIDAL EFFECTS

| Cpd. No. | R₁ | A₁ | A₂ | A₃ | A₄ | A₅ | S1 20 | S1 10 | S1 1 | S2, lbs./acre 10 | S2 1 | S2 .1 | S3, lbs./acre 10 | S3 1 | S3 .1 | S4 percent, .05 | S5 percent, .05 |
|---|---|---|---|---|---|---|---|---|---|---|---|---|---|---|---|---|---|
| 19 | H | H | Cl | Cl | H | H | 40 | 30 | 0 | 60 | 0 | | 20 | 20 | | 0 | 0 |
| 21 | H | H | CF₃ | Cl | H | H | 60 | 80 | 30 | 100 | 60 | 0 | 20 | | | 0 | 20 |
| 26 | CH₃ | H | CF₃ | Cl | H | H | 100 | 100 | 40 | | | | | | | 0 | 0 |
| 27 | H | H | CF₃ | H | CF₃ | H | 100 | 90 | 30 | | | | | | | 0 | 0 |
| 28 | H | CF₃ | H | H | Cl | H | 60 | 60 | 20 | | | | | | | 0 | 0 |
| 35 | CH₃ | Cl | H | Cl | H | H | | | | 30 | | | 40 | | | 60 | 0 |
| 37 | CH₃ | H | Cl | Cl | H | H | | | | 100 | 0 | | 20 | | | 100 | 0 |
| 39 | CH₃ | Cl | H | H | Cl | H | | | | 30 | | | 40 | 0 | 0 | 50 | 0 |
| 42 | C₂H₅ | H | CF₃ | H | CF₃ | H | 100 | 100 | 0 | 100 | 60 | 0 | 100 | 0 | | (.01)100 | 40 |
| 43 | H | Cl | H | H | Cl | H | | | | 100 | 0 | | 40 | 20 | | 0 | 20 |
| 48 | C₂H₅ | H | CF₃ | Cl | H | H | | | | 100 | 60 | 0 | 100 | 40 | 20 | 100 | |
| 49 | H | Cl | H | Cl | Cl | H | 60 | 40 | | | | | | | | 0 | 0 |
| 51 | H | H | CF₃ | Br | H | Br | 50 | 0 | | 100 | 60 | 0 | 20 | | | 30 | 20 |
| Control A | | | | | | | 0 | | | | | | | | | 0 | |
| Control B | | | | | | | 0 | | | | | | | | | 0 | 0 |
| Control C | | | | | | | 0 | | | | | | | | | 0 | 0 |
| Control D | | | | | | | 60 | 0 | | | | | | | | | |
| Control E | | | | | | | 0 | | | | | | | | | | |
| Control F | | | | | | | 0 | | | | | | | 0 | | 0 | |
| Control G | | | | | | | 0 | 0 | 0 | 0 | 0 | 0 | 0 | 0 | 0 | 20 | |

NOTE:
Results are in percent kill. The controls are the same as in Table 2.
The test insect species and application means are as follows:
S1=Cotton bollworm (topical).
S2=Cotton bollworm (sprayed plants).
S3=Boll weevil (sprayed plants).
S4=Cotton bollworm (systemic).
S5=Boll weevil (systemic).

Compound 42, 3,5 - di - trifluoromethyl-N-ethylanilinomethylenemalonitrile, when applied at a rate of 3 lbs./acre, by broadcast method, was found to be still active 3 months following the application. This prolonged activity is a necessary requirement for systemic insecticides.

In addition to insect organisms, the compounds of this invention have shown activity against nematodes and the enzyme fly cholinesterase.

The pesticidal compounds of the present invention are used singly or as a mixture, by applying a compound of the present invention, preferably in diluted form to the pest or locus of the pest being controlled, in a lethal amount. These compounds are sprayed or otherwise made to have contact with the insects to be controlled in an insecticidal effective amount. They are formulated as an emulsion in water, a solution in an organic solvent or formulated, on solid carriers, in the form of a dust, wettable powder or granules and the like.

Emulsions or suspensions are prepared by dispersing the anilinomethylenemalonitrile, per se or in the form of an organic solution, in water with the aid of a water soluble surfactant. By the term surfactant is meant "emulsifying agent," "dispersing agent," "wetting agent" and "spreading agent." A partial list of such compounds is set forth in "Soap and Chemical Specialties" vol. 31, No. 7, pp. 50–60; No. 8, pp. 48–61; No. 9, pp. 52–67; No. 10, pp. 38 and 67 (1955) and in Swartz, Perry and Berch's "Surface Active Agents and Detergents" (1958, Interscience Publishers, Inc., New York) vols. I and II.

The compounds of this invention can also be dispersed, by suitable methods (e.g. tumbling or grinding) on solid extending agents either of organic or inorganic nature and supplied to the insect pests environment in particulate form, such as powders, dusts, granules and the like. Such solid materials include, but is not limited to, kaolin, kieselguhr, talc, bentonite, fuller's earth, pyrophyllite, diatomaceous earth and the like, with the adsorbent clays such as bentonite being preferred.

There are a large number of organic liquids which can be used for the preparation of solutions, suspensions or emulsions of the compounds of this invention, such as isopropyl ether, dioxane, carbon tetrachloride, ethylene dichloride, hexane, heptane, benzene, toluene, xylene and the like. It may be advantageous to employ a mixture of organic liquids as the extending agent.

In all of the forms described above, the dispersions can be provided in a concentrated form suitable for mixing with or dispersing in other extending agents, or they can be provided ready for use.

The exact concentration of the anilinomethylenemalonitriles of this invention employed in combatting or controlling insect pests can vary considerably provided the required dosage (i.e. toxic or lethan amount) thereof is supplied to the pests or to the environment of the pests. When the extending agent is a liquid, the concentration of anilinomethylenemalonitrile employed to supply the desired dosage will be in the approximate range of 0.001 to 50 percent by weight. When the extending agent is a semi-solid or solid, the concentration of the anilinomethylenemalonitrile employed to supply the desired dosage generally will be in the range of 0.1 to 25 percent by weight. The amount of active ingredient in a concentrate, which normally will be mixed with an extender, is 5 to 95 percent by weight.

The compounds of this invention are applied to the locus of the present or anticipated insect infestation at a preferred rate of about 0.25 to about 4 lbs. per acre. The compounds are applied as a spray or particulate solid composition. For subsurface applications the compound in the form of a spray or particulate matter is mixed with the soil.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which resides in the present invention including all features which would be treated as equivalents thereof by those skilled in the art to which the invention pertains.

What is claimed is:

1. A method of controlling insects which comprises applying to the insect or locus of the insect an insecticidal effective amount of at least one anilinomethylenemalonitrile of the formula

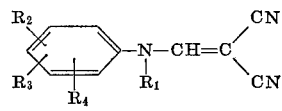

wherein R₁ is selected from the group consisting of hydrogen an alkyl having a maximum of 8 carbon atoms; R₂, R₃ and R₄ are each independently selected from the group consisting of hydrogen, alkyl having a maximum of 8 carbon atoms, hydroxy, alkoxy having a maximum of 4 carbon atoms, halogen, nitro, carboethoxy, trifluoromethyl, trichloromethyl,

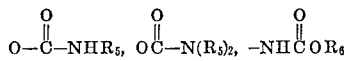

and $NH_2SO_2—$; $R_5$ and $R_6$ are alkyl groups having a maximum of 5 carbon atoms; provided that when $R_2$, $R_3$ and $R_4$ are selected from the group consisting of alkyl branched on the alpha carbon and trichloromethyl the groups are on other than adjacent carbon atoms; further provided that only one of the groups $R_2$, $R_3$ and $R_4$ is

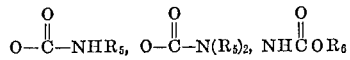

or $NH_2SO_2—$ the remaining groups being hydrogen.

2. A method in accordance with claim 1 in which $R_1$ is hydrogen.

3. A method in accordance with claim 2 in which $R_2$ and $R_3$ are halogen.

4. A method in accordance with claim 3 in which said halogen is chlorine and $R_4$ is hydrogen.

5. A method in accordance with claim 4 in which the compound is 3,4-dichloroanilinomethylenemalonitrile.

6. A method in accordance with claim 3 in which $R_4$ is trifluoromethyl.

7. A method in accordance with claim 6 in which said halogen is bromine.

8. A method in accordance with claim 7 in which the compound is 3-trifluoromethyl-4,6-dibromoanilinomethylenemalonitrile.

9. A method in accordance with claim 1 in which $R_1$ is alkyl.

10. A method in accordance with claim 9 in which $R_2$ is trifluoromethyl.

11. A method in accordance with claim 10 in which $R_3$ is trifluoromethyl and $R_4$ is hydrogen.

12. A method in accordance with claim 11 in which said alkyl is ethyl.

13. A method in accordance with claim 12 in which the compound is 3,5 - di - trifluoromethyl - N - ethylanilinomalonitrile.

14. A method in accordance with claim 1 in which the compound is 3-trifluoromethyl-4-chloroanilinomethylenemalonitrile.

15. A method for systemically killing insects which comprises applying to the plant environment which are subject to insect infestation an insecticidal effective amount of at least one compound of the formula

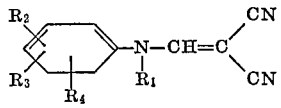

wherein $R_1$ is selected from the group consisting of hydrogen and alkyl having a maximum of 8 carbon atoms; $R_2$, $R_3$ and $R_4$ are each independently selected from the group consisting of hydrogen, alkyl having a maximum of 8 carbon atoms, hydroxy, alkoxy having a maximum of 4 carbon atoms, halogen, nitro, carboethoxy, trifluoromethyl, trichloromethyl,

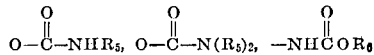

and $NH_2SO_2—$; $R_5$ and $R_6$ are alkyl groups having a maximum of 5 carbon atoms; provided that when $R_2$, $R_3$ and $R_4$ are selected from the group consisting of alkyl branched on the alpha carbon and trichloromethyl the groups are on other than adjacent carbon atoms; further provided that only one of the groups $R_2$, $R_3$ and $R_4$ is

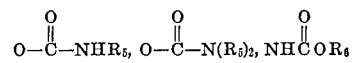

or $NH_2SO_2—$ the remaining groups being hydrogen.

16. A method in accordance with claim 15 in which $R_2$ is trifluoromethyl.

17. A method in accordance with claim 15 in which $R_3$ and $R_4$ is halogen.

18. A method in accordance with claim 17 in which said halogen is bromine.

19. A method in accordance with claim 18 in which the compound is 3-trifluoromethyl-4,6-dibromoanilinomethylenemalonitrile.

20. A method in accordance with claim 16 in which $R_1$ is alkyl, $R_3$ is trifluoromethyl and $R_4$ is hydrogen.

21. A method in accordance with claim 20 in which the compound is 3,5-di-trifluoromethylanilinomethylenemalonitrile.

22. An insecticidal composition comprising an inert insecticidal acceptable carrier and an insecticidal effective amount of the compound 3,5-di-trifluoromethyl-N-ethylanilinomethylenemalonitrile.

23. An insecticidal composition comprising an inert insecticidal acceptable carrier and an insecticidal effective amount of the compound 3,-trifluoromethyl-4,6-dibromoanilinomethylenemalonitrile.

24. An insecticidal composition comprising an inert insecticidal acceptable carrier and an insecticidal effective amount of the compound 3-trifluoromethyl-4-chloroanilinomethylenemalonitrile.

References Cited

UNITED STATES PATENTS 3,079,366  2/1963  Boyle _____ 260—465X
3,309,396  3/1967  Shulgin _____ 424—275

ALBERT T. MYERS, Primary Examiner

D. R. ORE, Assistant Examiner

U.S. Cl. X.R.

260—465; 424—300, 303, 357